United States Patent
Anderson et al.

(10) Patent No.: US 9,888,378 B2
(45) Date of Patent: Feb. 6, 2018

(54) ASSOCIATING A USER IDENTITY TO A WIRELESS SIGNAL

(71) Applicant: International Business Machines Corporation, Armonk, NY (US)

(72) Inventors: Eric M. Anderson, Friendswood, TX (US); Robert A. Davis, Atlanta, GA (US); Christopher J. Dawson, Arlington, VA (US); Salvatore T. Lococo, Rhinebeck, NY (US)

(73) Assignee: International Business Machines Corporation, Armonk, NY (US)

(*) Notice: Subject to any disclaimer, the term of this patent is extended or adjusted under 35 U.S.C. 154(b) by 846 days.

(21) Appl. No.: 13/928,509

(22) Filed: Jun. 27, 2013

(65) Prior Publication Data

US 2015/0003320 A1    Jan. 1, 2015

(51) Int. Cl.
*H04W 12/06* (2009.01)
*H04W 12/08* (2009.01)
*H04L 29/06* (2006.01)
*G07C 9/00* (2006.01)

(52) U.S. Cl.
CPC ........ *H04W 12/06* (2013.01); *G07C 9/00031* (2013.01); *H04L 63/101* (2013.01); *H04W 12/08* (2013.01)

(58) Field of Classification Search
CPC ...... H04W 12/06; H04L 63/08; H04L 63/101; G06F 21/62; G07C 9/00571
USPC ....... 455/411, 412.1, 412.2, 413, 414.1–415; 380/255; 709/223; 370/328
See application file for complete search history.

(56) References Cited

U.S. PATENT DOCUMENTS

| | | | |
|---|---|---|---|
| 8,126,145 B1 | 2/2012 | Tewari et al. | |
| 8,160,615 B1 | 4/2012 | Barnes et al. | |
| 8,209,264 B2* | 6/2012 | Wakabayashi | G06Q 20/3821 340/5.2 |
| 8,351,350 B2* | 1/2013 | Bhandari | G06F 13/4068 370/254 |
| 8,941,465 B2* | 1/2015 | Pineau | G06F 21/32 340/5.2 |
| 9,019,071 B1* | 4/2015 | Mallard | G07C 9/00087 340/5.3 |
| 9,317,982 B2* | 4/2016 | Hartmann | G07C 9/00111 |
| 2008/0081609 A1 | 4/2008 | Burgan et al. | |
| 2010/0201482 A1* | 8/2010 | Robertson | G07C 9/00111 340/5.61 |
| 2010/0283579 A1* | 11/2010 | Kraus | G07C 9/00944 340/5.7 |
| 2011/0225642 A1 | 9/2011 | Gopalakrishna | |

(Continued)

*Primary Examiner* — Khawar Iqbal
(74) *Attorney, Agent, or Firm* — John R. Pivnichny; Maxine L. Barasch; Keohane & D'Alessandro, PLLC

(57) ABSTRACT

Embodiments described herein provide approaches for associating a user identity to a wireless signal based on information received at an access point. Specifically, when a first user presents a set of user credentials to a physical access point, his/her profile is accessed to authenticate the first user. A set of wireless signals emanating from one or more wireless devices operated by the first user is also received at the physical access point and associated with the first user. Information about the first user may then be broadcast and accessed by a second user (e.g., via his/her mobile device) in proximity to the first user and in receipt of the set of wireless signals associated with the first user.

11 Claims, 5 Drawing Sheets

(56) References Cited

U.S. PATENT DOCUMENTS

| | | | |
|---|---|---|---|
| 2012/0026016 A1 | 2/2012 | Mitchell et al. | |
| 2012/0149338 A1* | 6/2012 | Roundtree | G06F 21/62 455/411 |
| 2012/0157052 A1* | 6/2012 | Quade | H04L 63/0853 455/411 |
| 2012/0196571 A1* | 8/2012 | Grkov | H04L 63/14 455/411 |
| 2013/0019298 A1* | 1/2013 | Jover Segura | H04L 63/101 726/7 |
| 2013/0173702 A1* | 7/2013 | Lang | H04L 41/28 709/204 |
| 2013/0324237 A1* | 12/2013 | Adiraju | G07F 17/3225 463/29 |
| 2014/0020056 A1* | 1/2014 | Hoesl | G06F 21/62 726/2 |
| 2014/0067677 A1* | 3/2014 | Ali | G06Q 20/02 705/44 |
| 2014/0091933 A1* | 4/2014 | Mohiuddin | G08B 13/246 340/572.1 |
| 2014/0096204 A1* | 4/2014 | Hoesl | G06F 21/62 726/4 |
| 2014/0120905 A1* | 5/2014 | Kim | H04W 12/06 455/426.1 |
| 2014/0125453 A1* | 5/2014 | McIntyre | H04L 63/0853 340/5.7 |
| 2014/0164603 A1* | 6/2014 | Castel | H04L 41/04 709/224 |
| 2014/0201809 A1* | 7/2014 | Choyi | H04L 63/0807 726/3 |
| 2014/0255036 A1* | 9/2014 | Jovicic | H04B 10/116 398/115 |
| 2015/0332527 A1* | 11/2015 | Pukari | G07C 9/00119 70/277 |
| 2016/0050203 A1* | 2/2016 | Hefetz | H04L 63/18 726/7 |

\* cited by examiner

ASSOCIATING A USER IDENTITY TO A WIRELESS SIGNAL

TECHNICAL FIELD

This invention relates generally to wireless signal identification and, more specifically, to associating a user identity to a wireless signal based on information received at a physical access point.

BACKGROUND

In today's business environment, many companies no longer assign specific offices, cubicles or dedicated workspaces to employees. Mobile employees are becoming more and more common. However, with mobile or floating employees, it is difficult to associate a user with the wireless signals they may be emanating (e.g., blue tooth, RFid, wireless, etc). Currently there are known solutions based on associating a person to a signal, but not in a dynamic nature.

It is further known that businesses maintain security of their physical premises to secure physical assets, information, and people. Security of physical premises can include, for example, requiring access credentials at an access control point to manage access of individuals to a secured location. Furthermore, at any given time, there may be dozens of wireless signals in range of the access control point. However, current approaches lack an effective solution for understanding which of those signals emanates from a person of interest present at the access control point.

SUMMARY

In general, embodiments of the invention provide approaches for associating a user identity to a wireless signal based on information received at a physical access point. Specifically, when a first user presents a set of user credentials to a physical access point, his/her profile is accessed to authenticate the first user. A set of wireless signals emanating from one or more mobile (i.e., wireless) devices operated by the first user is also received at the access point and associated with the first user. Information about the first user may then be broadcast and accessed by a second user (e.g., via his/her mobile device) in proximity to the first user and in receipt of the set of wireless signals associated with the first user.

One aspect of the present invention includes a method comprising the computer-implemented steps of: receiving a set of user credentials at an access control point of a secured area; authenticating an identity of a user by verifying the user credentials; receiving a set of wireless signals from one or more mobile devices at the access control point; and associating one or more of the set of wireless signals with the identity of the user.

Another aspect of the present invention provides a system for associating a user identity to a wireless signal based on information received at a physical access point, the system comprising: a memory medium comprising instructions; a bus coupled to the memory medium; and a processor coupled to a wireless signal identifier via the bus that when executing the instructions causes the system to: receive a set of user credentials at an access control point of a secured area; authenticate an identity of a user by verifying the user credentials; receive a set of wireless signals from one or more mobile devices at the access control point; and associate one or more of the set of wireless signals with the identity of the user.

Another aspect of the present invention provides a computer-readable storage medium storing computer instructions, which, when executed, enables a computer system to associate a user identity to a wireless signal, the computer instructions comprising: receiving a set of user credentials at an access control point of a secured area; authenticating an identity of a user by verifying the user credentials; receiving a set of wireless signals from one or more mobile devices at the access control point; and associating one or more of the set of wireless signals with the identity of the user.

Figure 1:
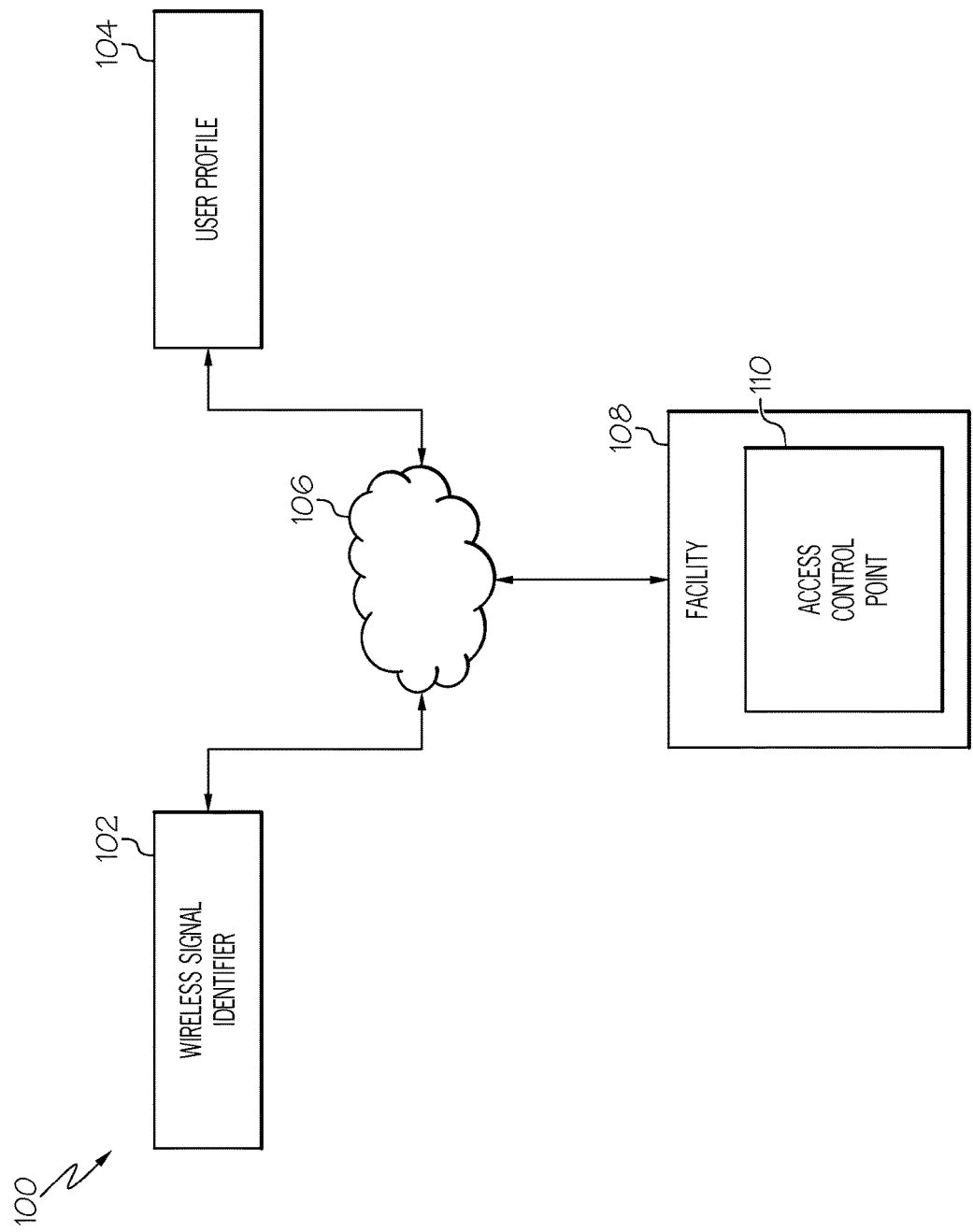
FIG. 1 shows a pictorial representation of a network in which aspects of the illustrative embodiments may be implemented.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Exemplary embodiments now will be described more fully herein with reference to the accompanying drawings, in which exemplary embodiments are shown. Embodiments of the invention provide an approach for associating a user identity to a wireless signal based on information received at an access point. Specifically, when a first user presents a set of user credentials to an access point, his/her profile is accessed to authenticate the first user. A set of wireless signals emanating from one or more mobile (i.e., wireless) devices operated by the first user is also received at the access point and associated with the first user. Information about the first user may then be broadcast and accessed by a second user (via his/her mobile device) in proximity to the first user and in receipt of the set of wireless signals associated with the first user.

It will be appreciated that this disclosure may be embodied in many different forms and should not be construed as limited to the exemplary embodiments set forth herein. Rather, these exemplary embodiments are provided so that this disclosure will be thorough and complete and will fully convey the scope of this disclosure to those skilled in the art. The terminology used herein is for the purpose of describing particular embodiments only and is not intended to be limiting of this disclosure. For example, as used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Reference throughout this specification to "one embodiment," "an embodiment," "embodiments," or similar language means that a particular feature, structure, or characteristic described in connection with the embodiment is included in at least one embodiment of the present invention. Thus, appearances of the phrases "in one embodiment," "in an embodiment," "in embodiments" and similar language throughout this specification may, but do not necessarily, all refer to the same embodiment.

With reference now to the figures, FIG. 1 depicts a system 100 that facilitates the association of a user identity to a wireless signal based on information received at an access point. System 100 can include a wireless signal identifier 102 that can comprise one or more servers for managing access to information stored in one or more storage components (not shown) connected to a network 106. One or more computers can be employed to implement the functions of wireless signal identifier 102, for example. Wireless signal identifier 102 can receive requests to a user profile 104 associated with one or more users and/or one or more authentication devices (e.g. a badge, RFID, bar code, etc.). Wireless signal identifier 102 can also communicate information associated with one or more facilities 108 and access points 110 (e.g., security stations, monitored areas, secured doors, etc., as can be observed by readers, keypads, sensors, and the like).

System 100 contains network 106, which is the medium used to provide communications links between each component. Network 106 may include connections, such as wire, wireless communication links, fiber optic cables, etc. System 100 also may be implemented as a number of different types of networks, such as, for example, an intranet, a local area network (LAN), or a wide area network (WAN). It will be appreciated that FIG. 1 is intended as an example, and not as an architectural limitation for different embodiments.

Figure 2:
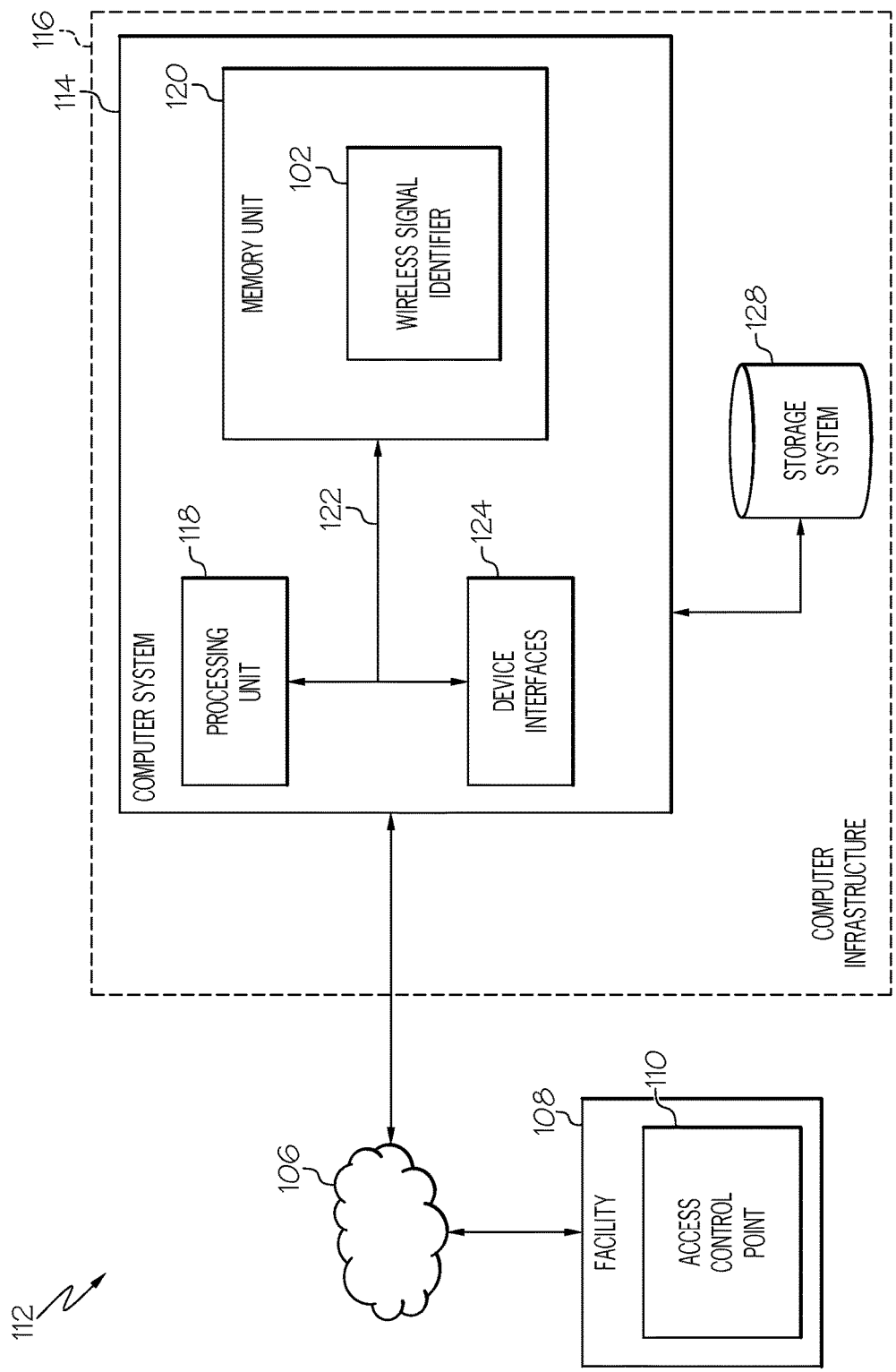
FIG. 2 shows a schematic of an exemplary computing environment according to illustrative embodiments.

Referring now to FIG. 2, a computerized implementation 112 of exemplary embodiments will be described in greater detail. As depicted, implementation 112 includes computer system 114 deployed within a computer infrastructure 116. This is intended to demonstrate, among other things, that embodiments can be implemented within network environment 106 (e.g., the Internet, a wide area network (WAN), a local area network (LAN), a virtual private network (VPN), a cloud computing environment, etc.), or on a stand-alone computer system. Still yet, computer infrastructure 116 is intended to demonstrate that some or all of the components of implementation 112 could be deployed, managed, serviced, etc., by a service provider who offers to implement, deploy, and/or perform the functions of the present invention for others.

Computer system 114 is intended to represent any type of computer system that may be implemented in deploying/realizing the teachings recited herein. In this particular example, computer system 114 represents an illustrative system for associating a user identity to a wireless signal. It should be understood that any other computers implemented under various embodiments may have different components/software, but will perform similar functions. As shown, computer system 114 includes a processing unit 118 capable of operating with wireless signal identifier 102 stored in a memory unit 120 to provide integrated access control and wireless signal identification, as will be described in further detail below. Also shown is a bus 122, and device interfaces 124.

Processing unit 118 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 118 receives user credential information from access point 110 of facility 108 and communicates it to wireless signal identifier 102. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 118 executes computer program code, such as program code for operating wireless signal identifier 102, which is stored in memory unit 120 and/or storage system 128. While executing computer program code, processing unit 118 can read and/or write data to/from memory unit 120 and storage system 128. Storage system 128 can include VCRs, DVRs, RAID arrays, USB hard drives, optical disk recorders, flash storage devices, and/or any other data processing and storage elements for storing and/or processing data. Although not shown, computer system 114 could also include I/O interfaces that communicate with one or more hardware components of computer infrastructure 116 that enable a user to interact with computer system 114 (e.g., a keyboard, a display, camera, etc.).

Figure 3:
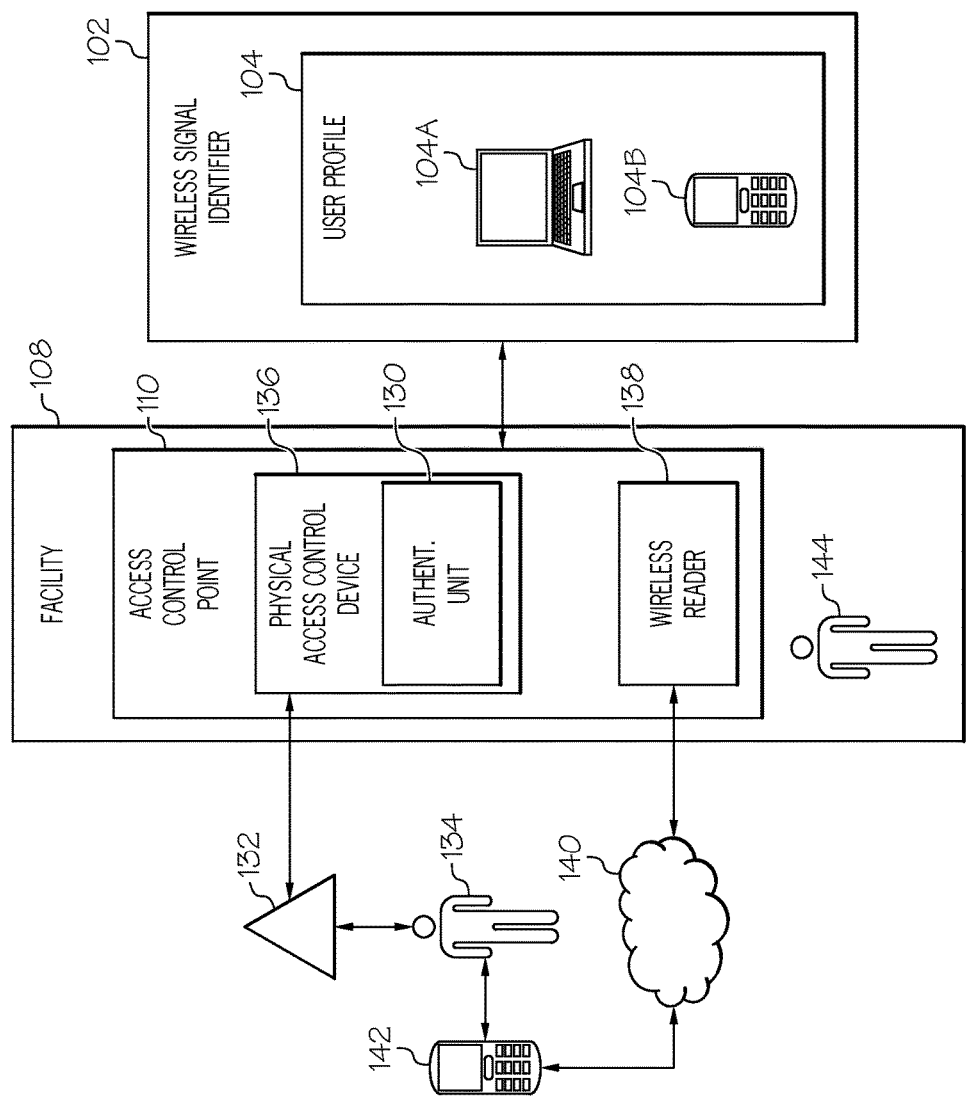
FIG. 3 shows an architecture in which integrated access control and wireless signal identification is implemented according illustrative embodiments.

Referring now to FIG. 3, the structure and operation of wireless signal identifier 102, user profile 104, and access control point 110 of facility 108 according to exemplary embodiments will be described in greater detail. As illustrated, wireless signal identifier 102 is configured to receive a set of user credentials 132 from a user 134 at access control point 110 of a secured area (i.e., facility 108 or an area within facility 108), and verify user credentials 132 of user 134 authenticated by an authentication unit 130. In one embodiment, authentication unit 130 can reference table(s) and/or list(s) that can include information associated with IT network access, such as network access credential information, network access policies, and information associated with physical access, such as physical access credential information and physical access policies of access control point 110 for user 134. Wireless signal identifier 102 and authentication unit 130 can facilitate enforcement of user profile 104 access policies as it pertains to each respective user.

Wireless signal identifier 102 communicates with a physical access control device 136 (e.g., access readers, which may comprise, for example, card readers, biometric readers, keypads, electromechanical locks, physical location/motion sensors, etc.) of access control point 110 to provide physical access credential information associated with respective users and the physical access policy associated with the access control point 110 of facility 108. Access control device 136 may be part of an access control system including one or more servers (not shown) that can manage user credentials, physical access policy, and physical access operation. Access control device 136 can provide wireless signal identifier 102 with updates or revisions to physical access credentials and the physical access policy, as access control device 136 can facilitate managing user physical access credentials, including new and expired physical access credentials. Access control device 136 also can manage and facilitate enrollment of new physical authentication devices, such as badges and key cards, which may be part of access control device 136.

During operation, when user 134 attempts to gain access to facility 108 via access control point 110, wireless signal identifier 102 also receives, via a wireless reader 138, a set of wireless signals 140 emanating from one or more mobile computing devices 142 (e.g., smart phone, cellular phone, tablet computer) carried by user 134. In one embodiment, wireless reader 138 (e.g., Bluetooth or RFID) is imbedded with physical control device 136, such as a badge scanner. When entering a secure location, the badge scanner also scans for strong new wireless signals and associates those signals (e.g., set of wireless signals 140) with the badge that was just scanned. In one embodiment, wireless signal identifier 102 associates one or more of set of wireless signals 140 with user 134 by comparing a relative strength of each wireless signal at a time that user credentials 132 are presented to physical control device 136. Those signals that are strongest at this moment are more likely to be associated with user 134. Wireless signal identifier 102 then compares the wireless signal identifier (e.g., a MAC address) with previously scanned signals 104A and 104B, which are recognized, within user profile 104, as being associated with the identity of user 134. In one embodiment, if wireless signal 140 is new, it's added to profile 104, and subsequently recognized as potentially being associated with user 134. In the case that new wireless signal 140 is again received (e.g., multiple times beyond a specified threshold amount), wireless signal identifier 102 can be relatively sure that new wireless signal 140 emanates from person 134 as opposed to a different user and/or source.

In one embodiment, wireless reader 138 and wireless signal identifier 102 are cable of understanding and/or ignoring background signal noise. To accomplish this, wireless signal identifier 102 invokes this process on a regular basis to understand background signal noise. That is, the wireless spectrum is scanned to gather all background signal information, which may be used later to understand what is new when a person enters the facility. In this embodiment, a data store (e.g., storage system 128 in FIG. 2) can be updated with any new background signals, wherein a signal is considered "background" if it has been scanned on numerous cycles. For every subsequently received wireless signal, wireless signal identifier 102 compares the newly received signal to the background noise. If the signal has been present for a given period of time, or if the signal was previously identified as background noise, it is disregarded and the signal checking continues.

Once it is known which signals represent user 134, wireless signal identifier 102 enables information about user 134 to be accessed by a second user 144 via a second wireless device (e.g., a tablet computer or smart phone) in proximity to user 134 such that wireless signal 140 is picked up by the second wireless device. In one embodiment, the second wireless device can constantly scan wireless signals in near proximity and display pertinent information about user 134 (e.g., a work order request in the form of an open ticket, contact information, areas of expertise, etc). Second user 144, having the appropriate software installed on his/her smart phone or tablet, will be able to see this information about user 134. In the case that second user 144 is an IT agent responsible for maintaining devices and addressing IT issues, second user 144 may receive an alert based on wireless signal 140 emanating from device 142 indicating that user 134 is in need of help, or that device 142 is in need of an update/fix.

In one embodiment, the second device may be a handheld device that scans for wireless signals being broadcast, and queries the user of those signals to see if the owners are in need of technical assistance (e.g., information of user 134 may indicate one or more open tickets). In another embodiment, wireless signal identifier 102 allows scanning and automatic display of contact data for nearby users. As an example of this, user 134 may enter a meeting with ten colleagues. Nine of the colleagues may be well known to user 134 and, even though the face of the tenth is familiar, user 134 is unable to recall any information about the tenth colleague. Utilizing mobile device 142, user 134 is presented with identifying and/or personal information about the tenth colleague, as well as information about everyone else in the room. This information may include names and work title(s), as well as personal information such as spouse name, children's names, areas of interest, and so on.

In yet another embodiment, user 134 may note an area of interest in his/her user profile 104, such as rock climbing or JAVA development. User 134 may then automatically receive a subsequent notification (e.g., with a profile and/or picture) that an individual nearby (e.g., second user 144) is also interested in rock climbing, while another is a JAVA subject matter expert. This will allow user 134 to recognize likeminded individuals and, therefore, engage in more meaningful conversation.

Figure 4:
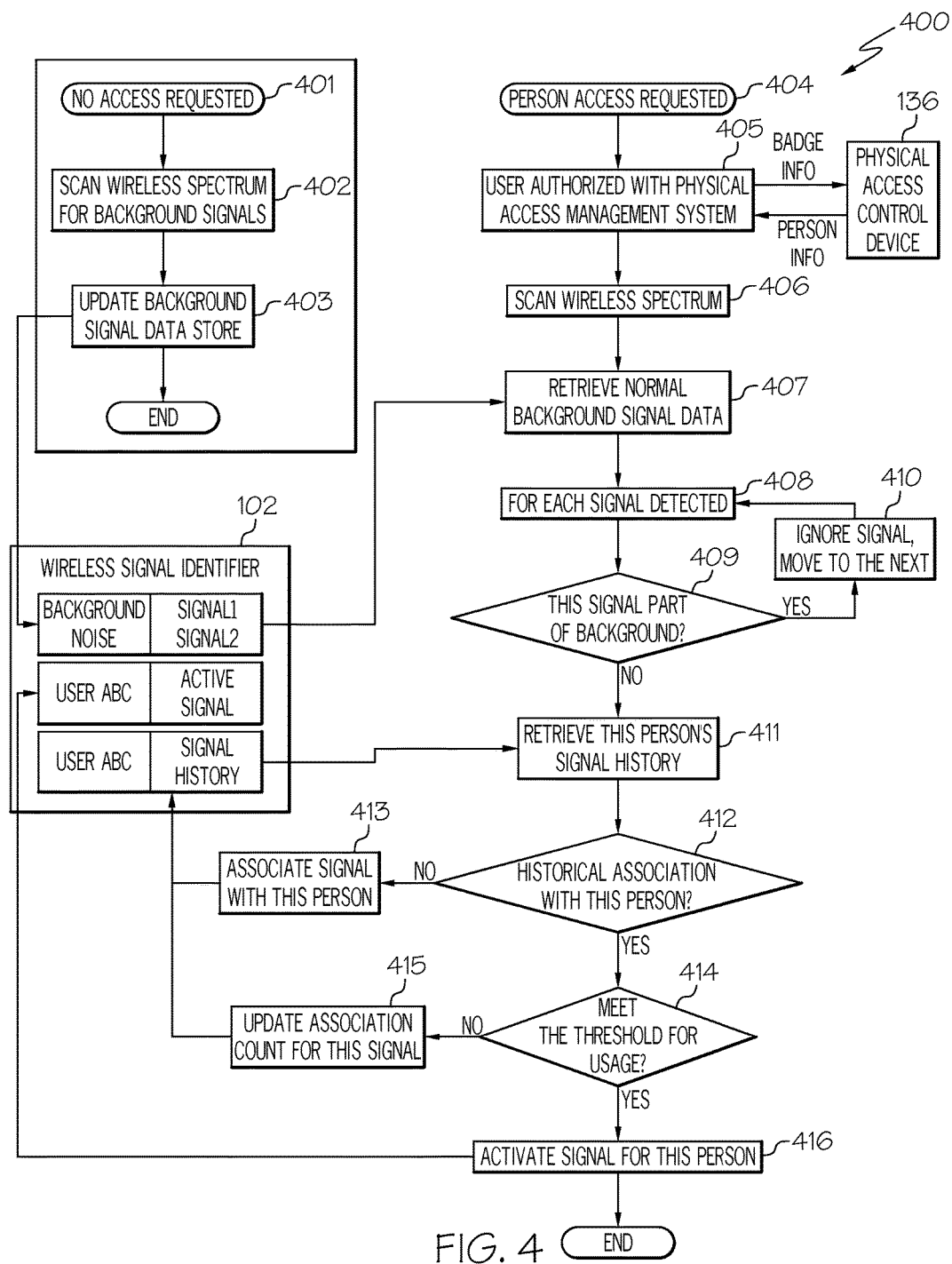
FIG. 4 shows a process flow for integrating access controls with wireless signals according to illustrative embodiments.

Turning now to FIG. 4, a process flow 400 for associating a user identity to a wireless signal will be shown and described in greater detail. In this embodiment, the following non-limiting steps are performed:

401) On a regular basis, a device such as physical access control device 136 (FIG. 3) that controls physical access to facility 108 (FIG. 3) will invoke this process to understand background signal noise;

402) Scan the wireless spectrum to gather all background signal information. This is used to determine what is a new signal when user 134 (FIG. 3) enters facility 108;

403) Update the data store with any new background signals. In this embodiment, a signal will only be considered "background" if it has been scanned on numerous cycles, not just once.

404) At this point, user 134 attempts to access facility 108 via a physical control system such as a badge or bio-metrics scanner of physical access control device 136 (FIG. 3);

405) Physical access control device 136 interacts with authentication unit 130 (FIG. 3) to understand who attempted to gain entrance to facility and if he/she is authorized. This verifies the identity of user 134;

406) Wireless reader 138 then scans the wireless spectrum to detect all wireless signals;

407) Since between steps 401-403 wireless signal identifier 102 (FIG. 3) has been collecting and analyzing background noise, wireless signal identifier 102 pulls in the background noise for comparison.

408-9) For every wireless signal, wireless signal identifier 102 will compare that signal to the background noise, e.g., to determine if the signal has been present for a while;

410) Since the signal was previously identified as background noise, disregard it and check the next;

411) Since the signal is new, retrieve a list of signals that have previously been associated with user 134 (e.g., in user profile 104);

412) It is determined if this new signal ever been associated with user 134;

413) If it has not, wireless signal identifier 102 will save that signal and associate it with user 134, he/she having just entered the facility. However this signal is not yet active;

414) Wireless signal identifier 102 compares the number of times this signal has been associated with user 134. If the number exceeds a certain threshold, wireless signal identifier 102 can be relatively sure that this signal emanates from user 134 vs. a different person and/or source;

415) Update association count for user 134 with this signal; and

416) Activate this signal for user 134. An active signal can be used for a certain period of time (for example, 18 hours).

It can be appreciated that the approaches disclosed herein can be used within a computer system to provide integrated access control and wireless signal identity association. In this case, wireless signal identifier 102 can be provided, and one or more systems for performing the processes described in the invention can be obtained and deployed to computer infrastructure 116. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 114 may be described in the general context of computer-executable instructions, such as program modules, being executed by a computer. Generally, program modules include routines, programs, people, components, logic, data structures, and so on, which perform particular tasks or implement particular abstract data types. Exemplary computer system 114 may be practiced in distributed computing environments where tasks are performed by remote processing devices that are linked through a communications network. In a distributed computing environment, program modules may be located in both local and remote computer storage media including memory storage devices.

Figure 5:
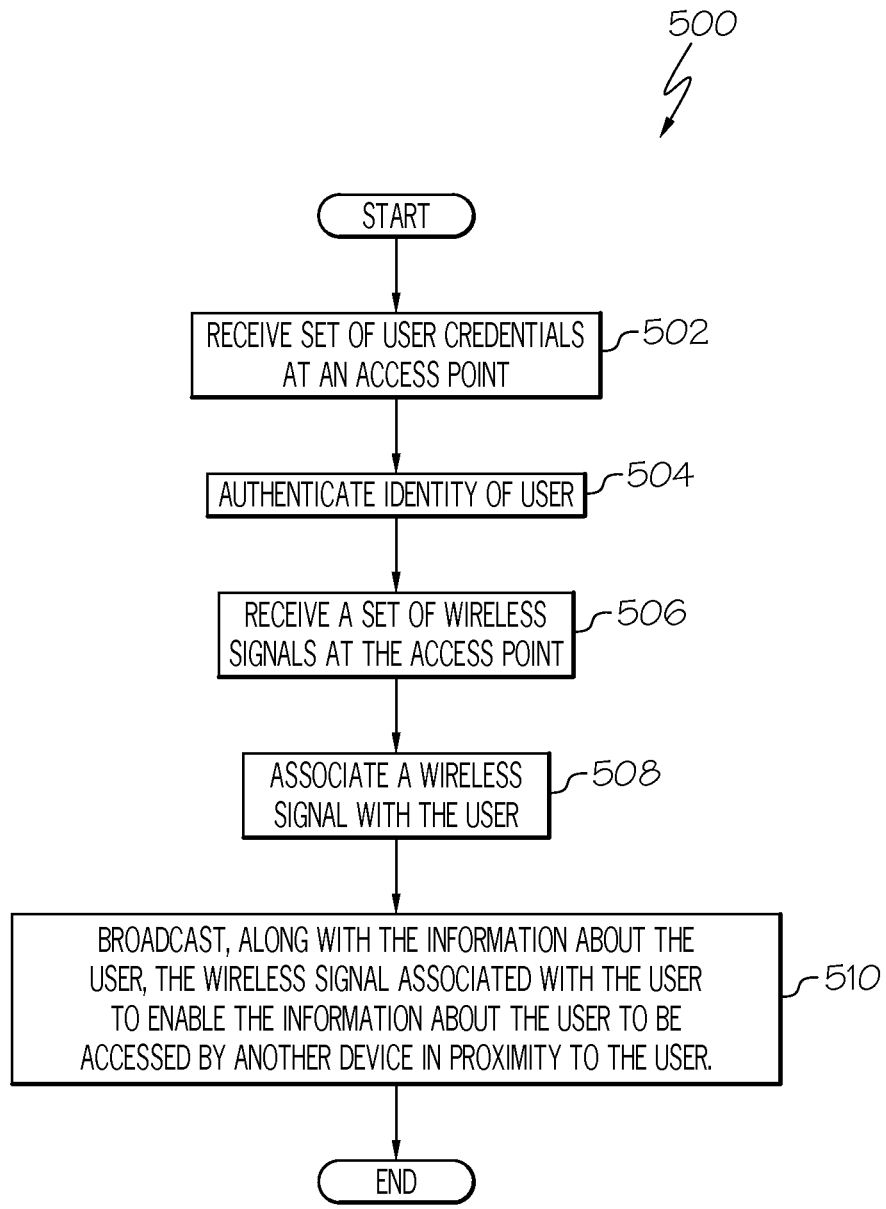
FIG. 5 shows another process flow for integrating access controls with wireless signals according to illustrative embodiments.

As depicted in FIG. 5, computer system 114 carries out the methodologies disclosed herein. Shown is a flow 500 for associating a user identity to a wireless signal based on information received at an access point. At 502, a set of user credentials is received at an access point. At 504, the identity of the user is authenticated. At 506, a set of wireless signals from one or more mobile devices operated by the user is received at the access control point. At 508, one or more of the set of wireless signals is associated with the user. At 510, the one or more set of wireless signals are broadcast, along with information about the user, to enable the information about the user to be accessed by another device in proximity to the one or more of the set of wireless signals.

The flowcharts of FIGS. 4-5 illustrate the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, as will be described herein, systems/units may also be implemented as a combination of software and one or more hardware devices. For instance, a wireless signal identifier 102 and authentication unit 130 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS)

techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

For example, an implementation of exemplary computer system 114 (FIG. 2) may be stored on or transmitted across some form of computer-readable storage medium. Computer-readable storage medium can be media that can be accessed by a computer. "Computer-readable storage medium" includes volatile and non-volatile, removable and non-removable computer storable media implemented in any method or technology for storage of information such as computer readable instructions, data structures, program modules, or other data. Computer storage device includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication medium" typically embodies computer readable instructions, data structures, and program modules. Communication media also includes any information delivery media.

It is apparent that there has been provided approaches for associating a user identity to a wireless signal based on information received at an access point. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method comprising the computer-implemented steps of:
providing a secured geographic area with an access control point, wherein the access control point comprises a wireless reader and a physical access control device, wherein the physical access control device comprises an electromechanical lock;
receiving a set of user credentials from an authentication device at the access control point of the secured geographic area;
authenticating an identity of a user by verifying the user credentials;
receiving multiple instances of a set of wireless signals associated with the user;
adding one or more of the set of wireless signals to a profile associated with the user in the case that the one or more of the set of wireless signals is not currently recognized as being associated with the user;
associating the one or more of the set of wireless signals with the user;
broadcasting the one or more of the set of wireless signals along with information about the user;
enabling the information about the user to be accessed by another device in proximity to the one or more of the set of wireless signals;
receiving another wireless signal; and
allowing the user access to the secured physical area, via the electromechanical lock, when it is determined that the received another wireless signal is a match to the machine access control (MAC) address of one or more of the set of wireless signals associated with the user.

2. The method according to claim 1, further comprising the computer-implemented steps of:
accessing a profile associated with the user; and
determining whether the one or more of the set of wireless signals is currently recognized, within the profile, as being associated with the user.

3. The method according to claim 1, the information about the user comprising a work order request.

4. The method according to claim 1, further comprising:
scanning the environment surrounding the access control point for wireless signals;
recognizing a set of background wireless signals from the wireless signals; and
comparing the set of wireless signals from one or more mobile devices of the user received at the access control point to the set of wireless background wireless signals to determine if one or more of the set of wireless signals is being received for the first time.

5. A system for associating a user identity to a wireless signal based on information received at an access point, the system comprising:
a memory medium comprising instructions;
a bus coupled to the memory medium; and
a processor coupled to a wireless signal identifier via the bus that when executing the instructions causes the system to:
provide a secured geographic area with an access control point, wherein the access control point comprises a wireless reader and a physical access control device, wherein the physical access control device comprises an electromechanical lock;
receive a set of user credentials from an authentication device at the access control point of the secured geographic area;
authenticate an identity of a user by verifying the user credentials;
receive multiple instances of a set of wireless signals associated with the user;
add one or more of the set of wireless signals to a profile associated with the user in the case that the one or more of the set of wireless signals is not currently recognized as being associated with the user;
associate the one or more of the set of wireless signals with the user;
broadcast the one or more of the set of wireless signals along with information about the user;
enable the information about the user to be accessed by another device in proximity to the one or more of the set of wireless signals;
receive another wireless signal; and
allow the user access to the secured physical area, via the electromechanical lock, when it is determined that the received another wireless signal is a match to the machine access control (MAC) address of one or more of the set of wireless signals associated with the user.

6. The system according to claim 5, further comprising instructions causing the system to:
   access a profile associated with the user; and
   determine whether the one or more of the set of wireless signals is currently recognized, within the profile, as being associated with the user.

7. The system according to claim 5, the information about the user comprising a work order request.

8. The system according to claim 5, further comprising instructions to:
   scan the environment surrounding the access control point for wireless signals;
   recognize a set of background wireless signals from the wireless signals; and
   compare the set of wireless signals from one or more mobile devices of the user received at the access control point to the set of wireless background wireless signals to determine if one or more of the set of wireless signals is being received for the first time.

9. A computer-readable hardware storage device storing computer instructions, which when executed, enables a computer system to associate a user identity to a wireless signal based on information received at an access point, the computer instructions comprising:
   providing a secured geographic area with an access control point, wherein the access control point comprises a wireless reader and a physical access control device,
   wherein the physical access control device comprises an electromechanical lock;
   receiving a set of user credentials from an authentication device at the access control point of the secured geographic area;
   authenticating an identity of a user by verifying the user credentials;
   receiving multiple instances of a set of wireless signals associated with the user;
   adding one or more of the set of wireless signals to a profile associated with the user in the case that the one or more of the set of wireless signals is not currently recognized as being associated with the user;
   associating the one or more of the set of wireless signals with the user;
   broadcasting the one or more of the set of wireless signals along with information about the user;
   enabling the information about the user to be accessed by another device in proximity to the one or more of the set of wireless signals;
   receiving another wireless signal; and
   allowing the user access to the secured physical area, via the electromechanical lock, when it is determined that the received another wireless signal is a match to the machine access control (MAC) address of one or more of the set of wireless signals associated with the user.

10. The computer-readable hardware storage device according to claim 9 further comprising computer instructions for:
    accessing a profile associated with the user; and
    determining whether the one or more of the set of wireless signals is currently recognized, within the profile, as being associated with the user.

11. The computer-readable hardware storage device according to claim 9, further comprising instructions for:
    scanning the environment surrounding the access control point for wireless signals;
    recognizing a set of background wireless signals from the wireless signals; and
    comparing the set of wireless signals from one or more mobile devices of the user received at the access control point to the set of wireless background wireless signals to determine if one or more of the set of wireless signals is being received for the first time.

* * * * *